United States Patent [19]

Biller et al.

[11] Patent Number: 4,717,578
[45] Date of Patent: Jan. 5, 1988

[54] PROCESS FOR PRODUCING DEHYDRATED PRODUCT RECONSTITUTABLE WITH AQUEOUS LIQUIDS

[75] Inventors: Florian Biller, Untergruppenbach-Unterheinriet; Horst Klukowski, Heilbronn-Böckingen, both of Fed. Rep. of Germany

[73] Assignee: CPC International Inc., Englewood Cliffs, N.J.

[21] Appl. No.: 600,589

[22] Filed: Apr. 16, 1984

Related U.S. Application Data

[63] Continuation of Ser. No. 184,578, Sep. 8, 1980, abandoned.

[30] Foreign Application Priority Data

Sep. 24, 1979 [DE] Fed. Rep. of Germany ....... 2938596

[51] Int. Cl.[4] ................................................ A23L 1/39
[52] U.S. Cl. ..................................... 426/589; 426/599; 426/661
[58] Field of Search ............... 426/589, 599, 616, 637, 426/640, 650, 661, 384, 385, 444, 456, 464, 471, 473, 524, 578, 638, 615; 127/29, 32

[56] References Cited

U.S. PATENT DOCUMENTS

| | | | |
|---|---|---|---|
| 2,442,928 | 6/1948 | MacMasters et al. | 426/444 X |
| 2,597,011 | 5/1952 | MacMasters et al. | 127/32 |
| 2,635,943 | 4/1953 | MacMasters | 426/521 X |
| 2,912,338 | 11/1959 | Barnes et al. | 426/640 |
| 3,100,909 | 8/1963 | Schapiro | 426/616 X |
| 3,433,650 | 3/1969 | Block et al. | 426/589 X |
| 3,443,964 | 5/1969 | Marotta et al. | 426/589 X |
| 3,579,341 | 5/1971 | Trubiano et al. | 426/589 X |
| 3,769,038 | 10/1973 | Mitchell et al. | 426/638 X |
| 4,031,266 | 6/1977 | Mitchell et al. | 426/661 X |
| 4,064,282 | 12/1977 | Hallstrom et al. | 426/444 X |
| 4,156,020 | 5/1979 | Bohrmann et al. | |

FOREIGN PATENT DOCUMENTS

| | | | |
|---|---|---|---|
| 978021 | 11/1975 | Canada | 426/589 |
| 1254562 | 11/1971 | United Kingdom | 426/589 |
| 1429638 | 3/1976 | United Kingdom | |

*Primary Examiner*—Arthur L. Corbin

[57] ABSTRACT

A dehydrated reconstitutable product is prepared by mixing tomato substance with starch and optionally with flavors, fillers, thickeners and/or auxiliary substances, wherein the starch is at least partially converted into a starch sponge having a grain size of from 0.125 mm. to 6 mm. When reconstituted with an aqueous liquid, the dehydrated product froms a pulpy textured tomato sauce, soup, juice or compote.

3 Claims, No Drawings

PROCESS FOR PRODUCING DEHYDRATED PRODUCT RECONSTITUTABLE WITH AQUEOUS LIQUIDS

This application is a continuation of application Ser. No. 184,578, filed 9/8/80, now abandoned.

BACKGROUND OF THE INVENTION

1. Field of the Invention

This invention relates to a dehydrated reconstitutable product which, when cooked with an aqueous liquid, forms a pulpy textured tomato sauce, soup, juice or compote, and to a process for its preparation. More particularly, this invention relates to a dehydrated reconstitutable product and process for its production wherein the product is comprised of an added starch, at least one flavoring component based on tomato solids, and optionally additional bodying components.

2. Description of the Prior Art

Dehydrated, reconstitutable edible products are well known. Their "application" and organoleptic properties, especially their taste, generally exhibit a quality for a fairly long time, which may be termed at least fully satisfactory and which shows no or only a minor difference from beverages, dishes or meal components such as sauces prepared by a housewife from fresh raw materials. However, preparations made from these well-known dehydrated products almost invariably feature a smooth, homogeneous structure. Frequently, this smooth homogeneous structure is regarded as not an inconvenience but particularly desirable since such a smooth, creamy consistency equally and quite deliberately is sought by the housewife preparing such a soup, sauce, or the like from fresh raw materials.

In certain cases, particularly in tomato sauce, tomato compote or pureed tomato soups, the housewife, however, desires and also prepares, from fresh or canned tomatoes, a product having pulpy texture or structure. This pulpy texture or structure represents an essential organoleptic quality feature which today, as a rule, still is missing completely in tomato soups, sauces, etc. made from dehydrated products. Food scientists have, of course, been aware of this deficiency for a fairly long time and have tried different ways to develop dehydrated products which, in combination with aqueous liquids, give juices, sauces, soups, etc. of a pulpy texture at least distantly resembling that of more or less finely pureed fruits of the variety in question e.g., "tomato concassée".

Attempts to solve the above-mentioned problem have proved, to put it cautiously, at best moderately useful. For example, in U.S. Pat. No. 3,443,964, it has been proposed to combine the "non-starch ingredients" of such a dehydrated product with a pregelatinized, cross-linked, amylose-containing, powdered starch product and to heat this mixture to at least 72° C. so as to effect the swelling of the starch particles therein. And in U.S. Pat. No. 4,031,266, it has been proposed to subject an aqueous mixture of tomato solids and gelatinizable starch materials, where the starch to water ratio has been selected so that only limited or partial gelatinization of the starch granules occurs, to a roll drying process for the production of a dehydrated product for "tomato beverages".

So-called "starch sponge", which is obtained when an aqueous starch paste is cooled, preferably slowly, to a point close to the freezing point or below, has been known for about one century; a description of starch sponge and its preparation is found in the article entitled "Starch Sponge—A Promising New Ingredient" by G. E. Hilbert et al, *Food Industries,* August 1945, pp. 878-882, incorporated herein by reference. Recommended uses of starch sponge in the food area have been confined principally to its use in candy, crackers, wafers, icings, etc., as a carrier for flavorings and to impart a crisp, crunchy texture to such products (see also U.S. Pat. No. 2,442,928 to MacMasters et al and "Starch Sponge" by MacMasters and Blom, *Chemurgic Digest* 4, No. 23, 1945, pp. 381-383.) In U.S. Pat. No. 4,064,282 to Hallstrom et al flavored starch sponge, in the form of relatively large pieces (about one square inch), is modified to withstand cooking by incorporating therein one or more heat stable gums.

The technique of gelatinizing and freezing starch-containing products to render them "quick-cooking" or "instant" is also known (e.g. U.S. Pat. No. 3,989,855 to Jones et al entitled "Freezing Process for Production of Instant Grits".) British Pat. No. 1,070,060 to Kellogg Company describes the preparation of freeze-dried banana (or other fruit-based) slices which will rehydrate in cold milk by combining banana puree with 5%-15% pregelatinized starch, incorporating a gas throughout the dough to provide a final porous product, freezing and finally freeze-drying the shaped pieces.

Surprisingly, although starch sponge and related techniques have been long known, the technology has not been applied (to the best of our knowledge) to provide a pulpy, characteristically home-made texture to dehydrated tomato-based sauces, compotes and the like, in spite of the fact that the art has been attempting to do this for many years.

SUMMARY OF THE INVENTION

Objects of the Invention

It is therefore an object of this invention to provide a dehydrated reconstitutable product and process for its preparation which avoids the disadvantages of the prior art.

It is an object of this invention to provide a dehydrated reconstitutable product which when reconstituted with aqueous liquids, not only possesses a taste quality comparable to prior art dehydrated products, but also possesses a pulpy structure or texture which even those skilled in the art cannot readily distinguish with a reasonable degree of certainty from dishes prepared by the housewife from tomatoes, and to provide a process for its preparation.

Other objects and advantages of the present invention will become apparent in the description and examples which follow herein.

BRIEF DESCRIPTION OF THE INVENTION

The invention comprises a dehydrated reconstitutable product which, when reconstituted with hot aqueous liquid, forms a pulpy textured tomato sauce, soup, juice or compote, the dehydrated product comprising added starch and at least one flavoring component based on tomato solids, wherein (a) the added starch is present at least partly in the form of a suitable starch sponge, (b) the starch sponge portion amounts to from 1% to 50% by weight of the dehydrated product, and (c) the grain size of the starch sponge component is within the range of 0.125 mm. and 6 mm.

Throughout the specification and claims all percentages are by weight, unless otherwise stated.

The invention is based on the discovery that particles of a suitable starch sponge (which term will be defined), in the presence of finely divided tomato solids (plus, optionally, added starch not in the form of a starch sponge, additional bodying agents, fillers, flavorings, etc.), will readily rehydrate in aqueous media to form a product which, in terms of its organoleptic properties and especially in terms of its texture, is essentially similar to a "concassée" prepared from tomato pulp or flesh.

The critical parameters of the invention are (1) the starch sponge component must be present in an amount of from 1% to 50% of the total dehydrated product; (2) the grain size of the starch sponge particles must be within the range of 0.125 mm. and 6 mm., preferably from 0.2 mm. to 4 mm. and most preferably from 1 mm. to 3 mm.; and (3) the starch sponge must be a "suitable starch sponge", which term will now be defined.

DETAILED DESCRIPTION OF THE INVENTION

By the term "suitable starch sponge" as used throughout the specification and claims is meant the porous product obtained when a starch paste is slowly frozen after which the water is removed, which resulting product has a relatively thick matrix with pores of approximately the same diameter as the walls of the matrix. Both pores and matrix should be visible to the naked eye. The structure should be multi-layered and leafy. When rehydrated by combining with cold water and brought to boiling a suitable starch sponge of the requisite grain size will adsorb water and the particles will swell, without substantial disintegration to provide a true "pulpy" texture, essentially similar to the texture of a home-made tomato sauce or concassée. Upon prolonged cooking the pulpy texture will decrease and ultimately disappear altogether; a suitable starch sponge is one which will retain its pulpy texture for at least 30 seconds of cooking time, and preferably for at least 1 to 2 minutes cooking time.

Starch sponges which are not suitable are those having large pores and a thin matrix (a "network-like" structure) or those having a "foam-like" structure, i.e., small pores and a thin matrix. Those unsuitable sponges having a thin and dense matrix are generally characterized by the starch being randomly oriented, as opposed to the leafy structure of suitable starch sponges. None of the aforementioned non-suitable starch sponges will produce the desired pulpy texture upon cooking in water.

To form a suitable starch sponge for use in the invention an aqueous starch paste (prepared by gelatinizing starch in water with heat or by combining a pre-gelatinized starch with water), having a starch concentration of at least 5%, preferably at least 8%, and not greater than 20% (optionally about 16%) is slowly cooled to near or below the freezing point, after which the moisture is removed to 10% or less (preferably about 3% or less) in such a way as not to destroy the sponge structure. A starch concentration of greater than 20% results in a too dense structure, which will not rehydrate properly, while a concentration of below 5% results in a structure which is too porous and "cotton-like." The drying can be accomplished as described by Hilbert et al in the previously mentioned article in *Food Industries*, August, 1945, i.e., by thawing, pressing out a major portion of the water and then drying to a final moisture content with heat. Alternatively, the frozen sponge can be freeze-dried or air-dried. It is important, in order to preserve the sponge structure, that the sponge not reach a temperature of greater than 40° C. during the drying; if the still-wet starch exceeds this temperature it will again paste, or gelatinize, and this will prevent the formation of a suitable starch sponge.

As previously stated, the starch sponge must be in the form of particles having a grain size within the range of 0.125 mm. and 6 mm., preferably from 0.2 mm. to 4 mm; and most preferably between 1 mm. and 3 mm. The fineness and degree of texturization in the final product may be selectively varied within the broad range by suitably choosing grain size as well as amount of starch sponge component.

Preferably the mass is comminuted to the final grain size during or after the freezing step, but prior to the final drying; the dried product can also be comminuted but this generally results in the production of undesirable "fines."

The cooling-freezing step should be conducted slowly, preferably to a temperature of minus 1° C. or lower; so-called "shock freezing" should be avoided, as it will prevent the formation of a suitable starch sponge.

The starch employed can be any of the common starch varieties as well as starch materials known to be equivalent to starches as regard their use in foods, especially high-starch flours. The preferred starches for the manufacture of starch sponges for use in the invention are the tuber and root starches, especially potato starch, but cereal starches and the so-called tuber-like starches such as waxy starches are also suitable. Also, mixtures of two or more starches may be employed.

The product of the invention is prepared by admixing a suitable starch sponge of the requisite grain size with tomato solids plus other optional ingredients such as fillers, flavors, bodying agents, thickeners such as starch not in sponge form, etc.

The product should contain from 2% to 70%, preferably 3.5% to 50% and most preferably 5% to 25% added starch (including the starch sponge component) based on total product weight. Bearing in mind that the total product must contain at least 1% starch sponge, at least 10% of the added starch, preferably at least 30% of the added starch, and most preferably more than 50% of the added starch should be in the form of starch sponge. In the most preferred embodiment the entire added starch portion is present as starch sponge.

The tomato solids may be present in any form, e.g., tomato powder and/or freeze-dried tomato flesh or pulp. A certain degree of texturizing, over and above that provided by the starch sponge, may be achieved by the use of tomato flesh of a suitable grain size which has been dried by freeze-drying or by a similar structure-conserving drying process. However, such material is not only comparatively expensive but, as has surprisingly been found, it does not impart a texture effect as pronounced as that produced by the starch sponge even if all of the tomato component is added in this form.

Although, as previously mentioned, it is absolutely sufficient to admix a simple, suitable starch sponge of the requisite grain size with the remaining dry products of the formula, in a preferred embodiment a portion of the tomato solids (and/or other dry ingredients) is incorporated into the sponge during the preparation of same, to form what will be referred to as a "compound starch sponge." The compound starch sponge must, of course, meet the previously mentioned criteria of a "suitable starch sponge", and care must be taken to insure this.

The compound starch sponge must contain at least 30% starch, and preferably about 50% starch. If one tries to incorporate much more than 70% non-starch solids into a compound starch sponge a suitable product is not obtained. For example, when products were prepared in accordance with the teaching of previously mentioned British Pat. No. 1,070,060 to Kellogg Company, containing a ratio of starch to total dry substance (starch plus banana solids) of 1 to 4, the resulting products, when combined with cold water and brought to boiling, did not produce products having a pulpy texture.

A compound starch sponge for use in the invention can conveniently be prepared by first forming an aqueous starch paste of 5% to 20% starch, adding the tomato component, and then freezing and further processing as previously described; this process should be followed for the preparation of compound sponges having relatively low starch concentrations. In preparing a compound starch sponge of 50% or greater starch, on the other hand, all of the ingredients can simply be combined at one time, and the mixture heated to gelatinize the starch, after which the mass is frozen, etc.

The following examples will serve to illustrate more fully the present invention and some of its advantages.

EXAMPLE 1

A dehydrated product which, when reconstituted by adding to cold aqueous liquid and bringing to boiling, forms a pulpy textured tomato sauce was prepared using the following recipe.

| Commercial tomato powder | 20% |
| Freeze-dried tomato pulp | 20% |
| Tomato compound starch sponge | 25% |
| Sugar | 10% |
| Seasoning | 25% |
| | 100% by weight |

First, the tomato compound starch sponge (in an amount of 1,000 kgs) was prepared as follows.

Into a vessel equipped with a stirring device were put, in the order given, 345 kgs water, 4 kgs powdered citric acid, 476 kgs double-concentrated tomato pulp containing 28% dry substance, and 175 kgs native potato starch containing about 18% moisture. The mixture was stirred until homogeneous and then pumped into a heating tank, wherein it was heated to 80° C. to 90° C. to gelatinize the starch. The mass was then transferred to foil-lined cups of 15 kg capacity in layers of approximately 3 cm depth, the cups were covered with foil, and transported to a cooling cell where the product was cooled, over a period of 35 minutes, to a surface temperature of 0° C. The cups were then transferred to a freezing unit where the product was frozen over a period of about 12 hours to a product temperature of about minus 15° C. (air temperature minus 18° C. to minus 25° C.). The deep-frozen product was removed from the cups and broken in a crusher into "fist-size" pieces and then transferred to a cutter, which had been pre-cooled with ice, and ground to a particle size of 2 mm. to 4 mm. The processing temperature during the grinding step was kept at below 0° C. in order to maintain the product in frozen form. The frozen grated sponge was then air-dried in a darrè dryer at an air temperature of about 70° C. The product in the dryer was in the form of a layer about 3 cm to 6 cm deep; the product did not reach a temperature of above 40° C. during the drying. The drying was conducted until the product had a moisture content of about 3%.

The resulting "pulpinate" was then blended with the remaining ingredients of the recipe to produce the final dehydrated product.

By adding water and cooking, the dehydrated product prepared in accordance with the example was converted into a tomato sauce. This tomato sauce was fully satisfactory in taste and also showed a texture equivalent to that of a tomato concassée prepared by the housewife from fresh peeled tomatoes.

EXAMPLE 2

Example 1 was repeated except, in the preparation of the compound starch sponge, the added water and double concentrated tomato pulp were replaced with 821 kgs of a tomato pulp containing 6% solids. The product was identical to that of example 1.

EXAMPLE 3

A potato starch sponge was prepared by gelatinizing an aqueous suspension of starch (about 16% solids) and processing it in accordance with the process of example 1, except the frozen starch sponge was ground to a grain size of between 0.2 and 0.5 mm. The sponge was combined with the other ingredients in the following recipe:

| Commercial tomato powder | 32% |
| Freeze-dried tomato pulp | 20% |
| Starch sponge | 13% |
| Sugar | 10% |
| Seasoning | 25% |
| | 100% (by weight) |

The tomato sauce prepared from this dehydrated product showed a somewhat finer but still fully satisfactory concassée texture.

It is understood that the examples are exemplary and not restrictive, and that other variations may be made within the scope of this invention.

What is claimed is:

1. A process for producing a reconstituted dehydrated product which comprises
   (a) admixing tomato solids and a starch sponge consisting of a starch matrix having pores of approximately the same diameter as the walls of the matrix and which will retain a pulpy texture for at least 30 seconds of cooking time, wherein the grain size of the starch sponge component is within the range of 0.125 mm. to 6 mm., and wherein the starch sponge amounts to from 1% to 50% by weight of the total product; and
   (b) reconstituting said dehydrated product by adding aqueous liquid, and bringing the dehydrated product to boiling,
thereby forming a pulpy textured tomato sauce, soup, juice or compote.

2. A process as defined in claim 1 further including the step of mixing flavors, fillers, additional thickeners and/or auxiliary substances with the tomato solids and the starch sponge.

3. A process as defined in claim 1 further including the step of incorporating tomato solids into the starch sponge during preparation of same, and admixing the thus prepared compound starch sponge, having a grain size of from 0.125 mm. to 6 mm., with additional tomato solids to form the final product.

* * * * *